United States Patent [19]
Wallis

[11] 3,786,910
[45] Jan. 22, 1974

[54] VERTICAL CONVEYOR
[75] Inventor: Charles W. Wallis, Cary, Ill.
[73] Assignee: American Chain & Cable Company, Inc., New York, N.Y.
[22] Filed: July 20, 1972
[21] Appl. No.: 273,520

[52] U.S. Cl. ................................. 198/158, 198/38
[51] Int. Cl. ............................................ B65g 15/00
[58] Field of Search ...................... 198/154–158, 38

[56] References Cited
UNITED STATES PATENTS
3,366,224  1/1968  Sauvee............................... 198/158
3,184,032  5/1965  Jonsson............................. 198/156

*Primary Examiner*—Richard E. Aegerter
*Attorney, Agent, or Firm*—Arthur Raisch et al.

[57] ABSTRACT

An endless vertical conveyor having a vertical reach, carriers mounted on the conveyor at longitudinally spaced points including a base and an article support mounted on each said base and movable transversely such that it can be positioned adjacent a loading or unloading station as the conveyor moves vertically. Each article support includes a cam that is engaged by an actuator selectively to move the article support transversely such that it will be adjacent the loading or unloading station. Guide means are provided for engaging a roller on the article support and guiding the article support to and from the station as the conveyor moves vertically.

16 Claims, 14 Drawing Figures

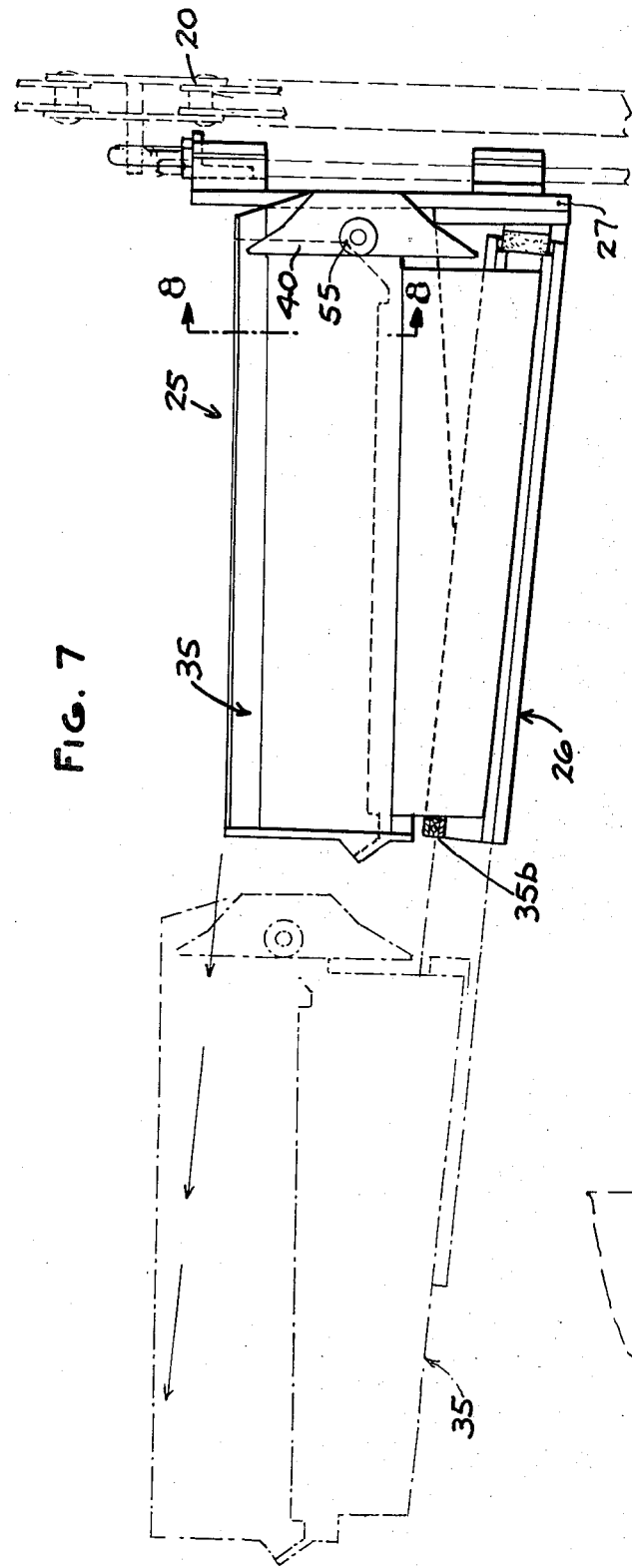
FIG. 7
FIG. 8
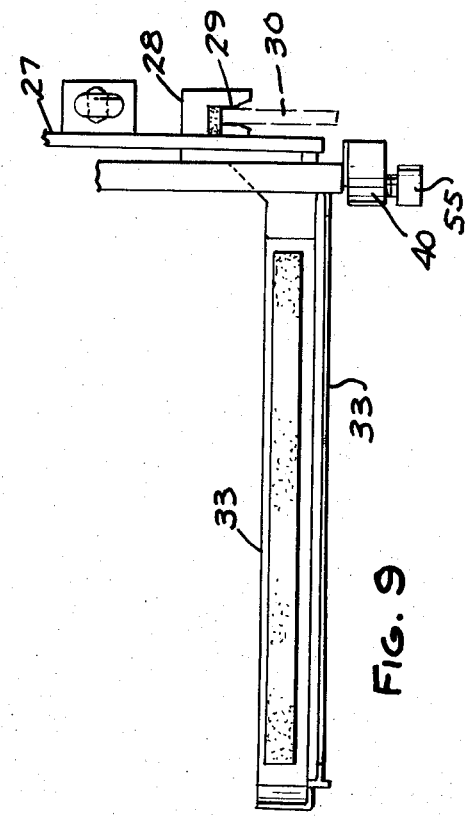
FIG. 9

VERTICAL CONVEYOR

This invention relates to vertical conveyors.

BACKGROUND OF THE INVENTION

In moving articles from one vertical elevation to another, it has heretofore been suggested to use a continuously moving conveyor having carriers at longitudinally spaced points which are projected transversely to the loading or unloading station as the conveyor moves vertically. The carrier supports the load in such a manner that the load is picked up or delivered to the station without interrupting the movement of the conveyor.

In such conveyor systems, it has been common to provide guide tracks for the carrier and these tracks normally extend throughout the entire vertical path of the carrier.

Among the objects of the invention are to provide a conveyor of the vertical type wherein the construction is relatively simple, which is reliable, low in cost, can be easily adapted to vertical conveyors and which necessitates only guiding of the article support or carrier during loading or unloading, and on which carriers can be provided in close vertical spacing.

SUMMARY OF THE INVENTION

In accordance with the invention, the endless vertical conveyor has a vertical reach. Carriers are mounted on the conveyor at longitudinally spaced points and include a base and an article support mounted on each said base and movable transversely such that it can be positioned adjacent a loading or unloading station as the conveyor moves vertically. Each article support includes a cam that is engaged by an actuator selectively to move the article support transversely such that it will be adjacent the loading or unloading station. Guide means are provided for engaging and guiding the article support to and from the station as the conveyor moves vertically.

DESCRIPTION OF THE DRAWINGS

FIG. 7 is a fragmentary side elevational view of a portion of the conveyor.

FIG. 8 is a fragmentary sectional view taken along the line 8—8 in FIG. 7.

FIG. 9 is a fragmentary plan view of a portion of the conveyor shown in FIG. 7.

DESCRIPTION

Figure 3:
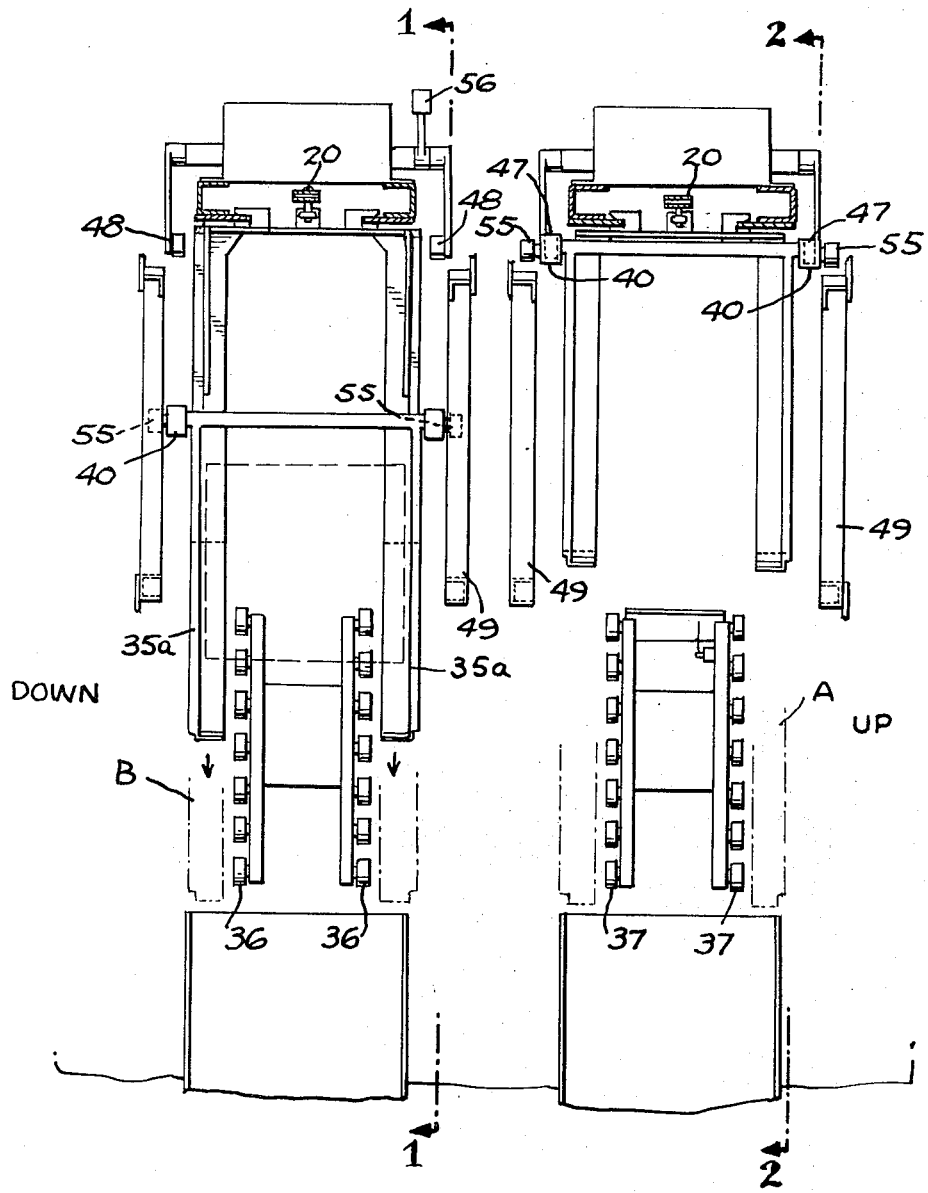
FIG. 3 is a fragmentary sectional view taken along the line 3—3 in FIG. 1.
Figure 4:
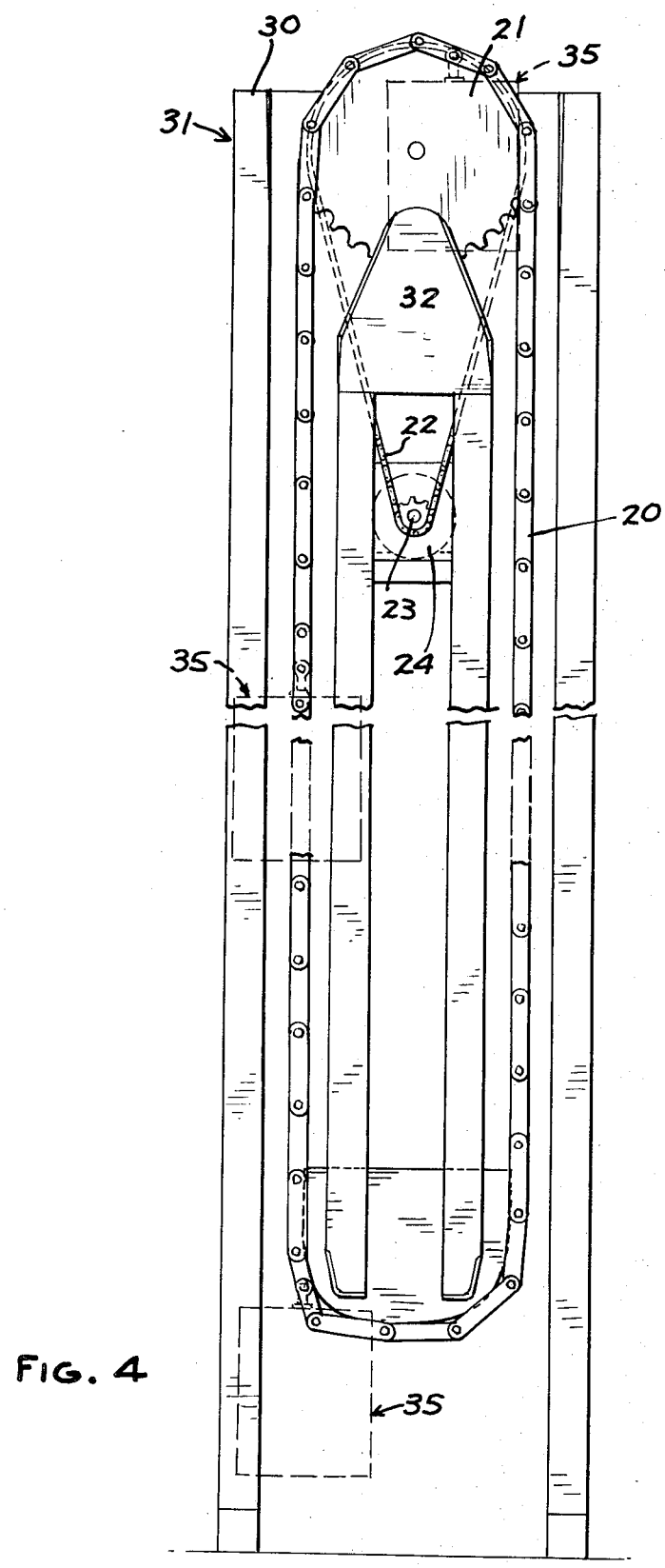
FIG. 4 is a fragmentary sectional elevational view taken along the line 4—4 in FIG. 1.

Referring to FIG. 4, the vertical conveyor embodying the invention comprises an endless chain conveyor 20 that is trained over a sprocket 21 which has its axis extending horizontally and is driven through a chain 22 by a sprocket 23 of a motor 24. The endless chain 20 thus has two vertical reaches and a plurality of carriers 25 are provided at longitudinally spaced points thereon. One or more loading an unloading stations are provided in pairs at various elevations adjacent each reach, one station being a delivery station and the other being a loading station. Thus, as shown in FIG. 3, the station A on the right is adapted to be the unloading station wherein the carriers 25 remove a load from the station A and the station B on the left is adapted to be the loading station wherein the carriers 25 deliver a load to the adjacent station B as the conveyor moves vertically downwardly relative thereto. Although only two stations are shown, a plurality of vertically spaced loadingg and unloading stations can be provided.

Referring to FIGS. 7–9, each carrier 25 includes a base 26 comprising a base plate 27 mounted on the conveyor chain 20 and having guides 28 thereon defining grooves 29 into which guide plate 30 on framework 31 extend. In this manner, the base 26 is guided and maintained in stable relation as the conveyor moves vertically. The guide plates 30 are relieved at their upper ends adjacent the sprocket as at 32 to permit the movement of the base 26 laterally into engagement with the guide plates 30 on the other side.

The base 26 further includes a pair of stationary arms 33 fixed to the plate 27. The carrier 25 also includes an article support 35 that is mounted for transverse movement with respect to the arms 33 by bearings 35b. Article support 35 includes generally horizontal arms 35a. As shown, the arms 33 are inclined with respect to the horizontal such that the article support 35 moves upwardly and forwardly. In its normal position, the article support 35 is retracted but, as presently described, may be moved transversely outwardly into position such that it overlies or underlies the loading or loading station.

Figures 1, 2:
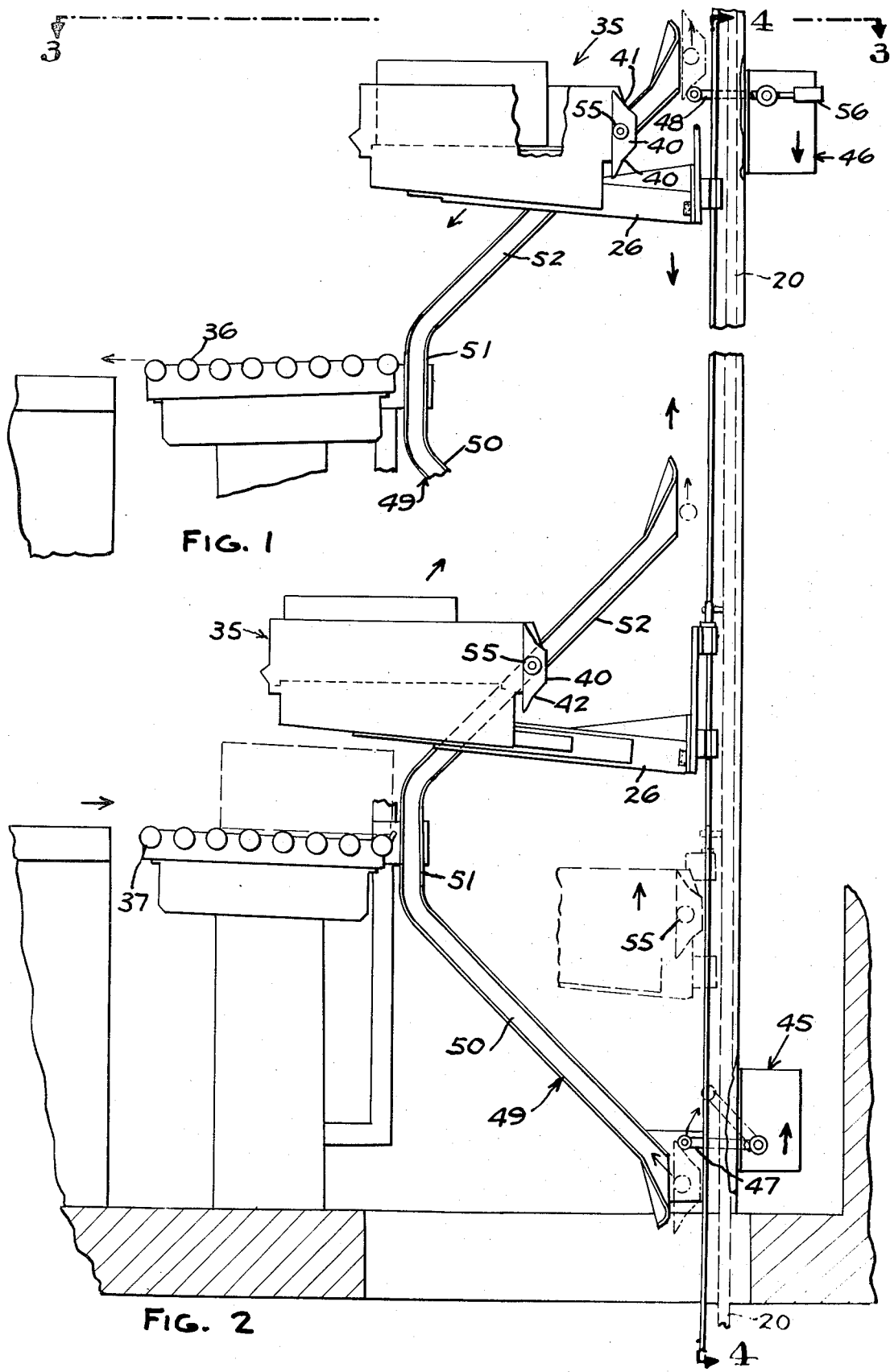
FIG. 1 is a fragmentary vertical elevational view of a portion of the conveyor system taken along the line 1—1 in FIG. 3.
FIG. 2 is a fragmentary vertical elevational view of another portion of the system taken along th line 2—2 in FIG. 3.

Referring to FIGS. 1 and 2, at the unloading station, two spaced rows of rollers 36 are provided on which the article to be unloaded is delivered as the carrier moves downwardly, the arms 35a of the article support 35 straddling the rollers 36. Similarly, at the loading station, rollers 37 are provided in two rows and the arms 35a of the article support 35 straddle and pass upwardly to remove a load from the rollers 37. As shown in FIG. 1, at the unloading station, the rollers 36 are in a plane that is inclined downwardly and outwardly while at the loading station, the rollers define a plane that is inclined downwardly and inwardly.

Each carrier 25 includes a cam 40 on the side wall of the article support 35. Each cam 40 has upwardly and downwardly facing cam surfaces 41, 42 which are concave in vertical section and straight in horizontal section. In its normal position, the article support 35 is maintained in its retracted position by the inclined support on the base 26. In advance of loading and unloadingg stations, actuator means 45, 46 is provided which includes levers 47, 48, respectively, that are normally yieldingly in the path of each cam 40. If there is to be no delivery or pick-up, that is, no loading or unloading, the levers 47, 48 are merely swung out of their normal position by the cam 40 and then return to their normal position. If, however, upon suitable signal received from settings on the carrier, or other device, the carrier is to be loaded or unloaded, the levers 47 or 48, as the case may be, are locked in their positions such that they will force the cam 40 and, in turn, the carrier or article support outwardly so that a roller 55 on cam 40 is projected into the path of a guide track 49. As the conveyor continues to move vertically, the article support is gradually moved transversely by guide track 49 to a position where it is in telescoping relation to the loading or unloading station, as the case may be. Each guide track 49 is generally U-shaped in cross section and includes an inclined portion 50 which guides the article support to the station, a vertical portion 51 which holds the article support in proper position as it is moved vertically through the station, and an inclined portion 52 which returns the article support to its retracted position.

Figure 10:
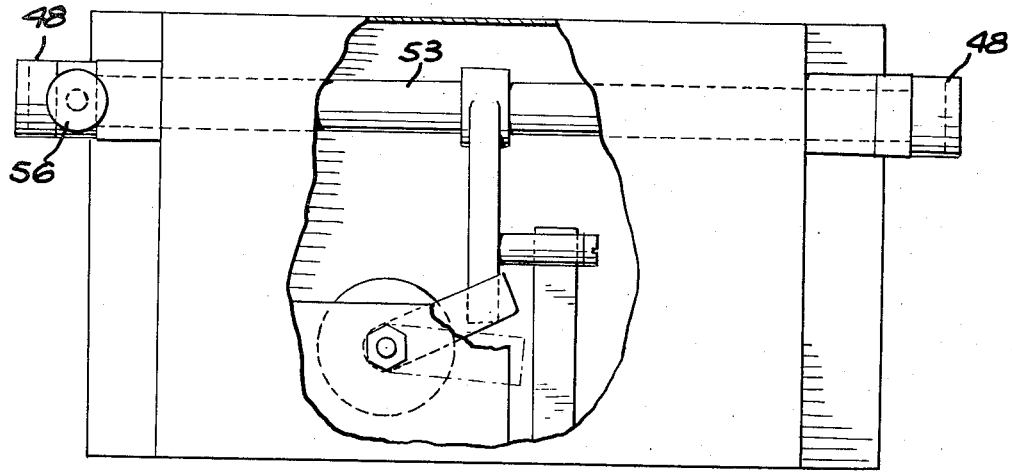
FIG. 10 is an end elevational view of a portion of the conveyor system.
Figure 11:
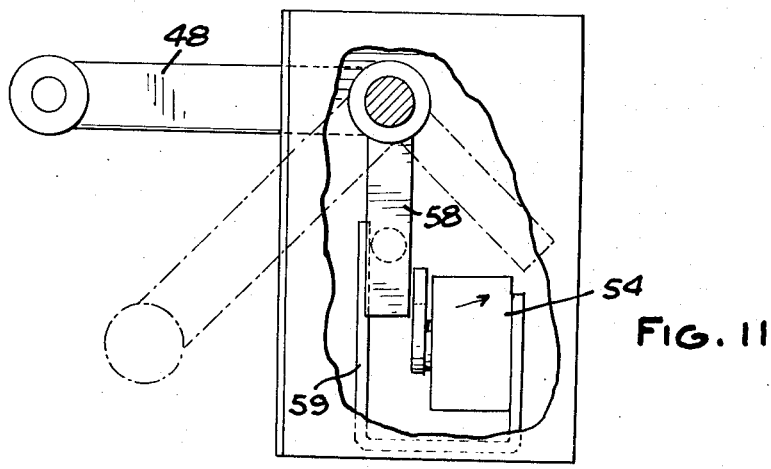
FIG. 11 is a front elevational view of the portion shown in FIG. 10.

The specific nature of the actuator mechanisms 45 is shown in FIGS. 10 and 11 wherein the levers 48 are mounted on the ends of a shaft 53 that is pivoted and a counterweight 56 yieldingly urges the lever 48 upwardly. A rotary solenoid 54 actuated an arm 57 into the path of a lateral arm 58 fixed to the shaft 53 to lock the lever 48 between a fixed stop 59 and arm 57 to prevent its rotation when the cam 40 engages the lever 48. The mechanism 45 at the loading station is substantially identical to that shown in FIGS. 10 and 11 except that there is no counterweight needed.

Figure 12:
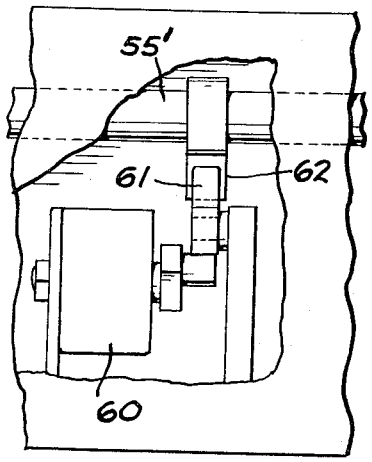
FIG. 12 is a fragmentary end view of a modified form of actuator utilized in the apparatus.
Figure 13:
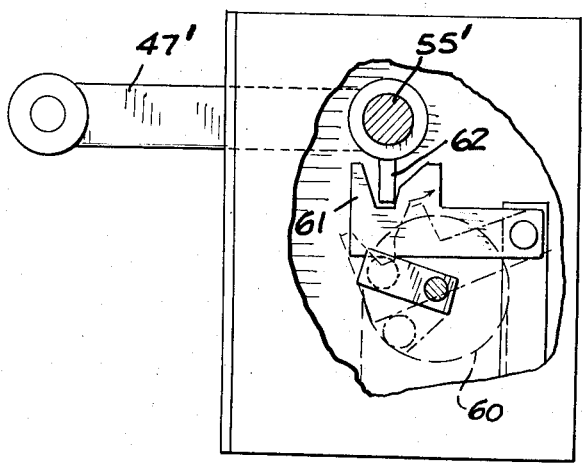
FIG. 13 is a fragmentary part sectional view of the apparatus shown in FIG. 12.

A modified form of actuating mechanism is shown in FIGS. 12 and 13 wherein the rotary electric motor 60 functions to project a pivoted latch 61 into position for engagement with a projection 62 on the shaft 53'.

Figure 5:
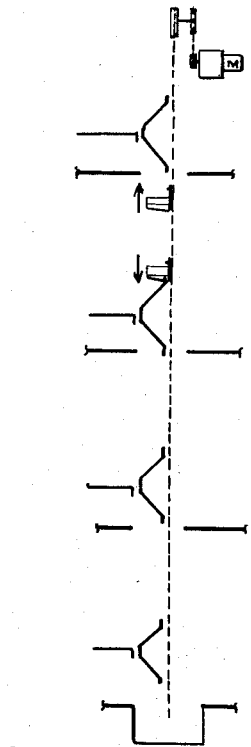
FIG. 5 is a diagrammatic view of one form of the conveyor.

Referring to FIGS. 1, 2 and 5, in operation, as the conveyor 20 is continuously operated, if an appropriate signal is provided by the signal system, actuator lever 47 will be locked in position and as carrier moves upwardly, the lever 47 will engage the surface 41 of the cam 40 to move the article support 35 transversely into the guide track 49 (FIG. 2). As the conveyor continues to move, the article support 35 is moved transversely away from the plane of the conveyor 20 and brought into position so that the legs of the article support 35 will pass upwardly and engage and remove a load from the rollers 37 at the loading station. Further movement of the conveyor will cause guide track 49 to return the article support 35 to its original position with respect to the base 36, after which it is released from control by the guide track 49.

In the event that a signal is received to unload, the lever 48 along the other reach of the conveyor is locked in position causing it to engage the surface 42 of the cam 40 and move the article support 35 transversely outwardly into the path of the guide track 49 (FIG. 1). Further movement of the conveyor will cause the article support 35 to be translated outwardly by the section 52 so that when it reaches a position adjacent the rollers 36, the article support 35 thereon will be transferred to the rollers 36. Further movement of the conveyor 20 will cause the article support 35 to be returned to its original position with respect to the base 26 whereupon control of the article support by the guide track 49 will cease.

Figure 6:
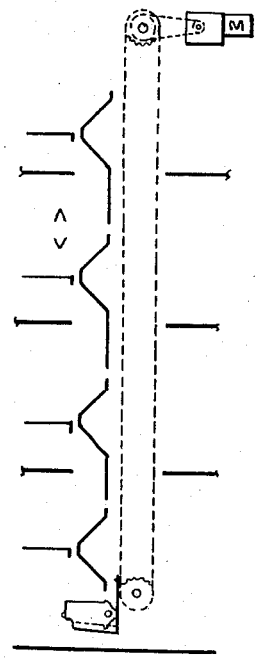
FIG. 6 is a diagrammatic view of another form of the conveyor.
Figure 14:
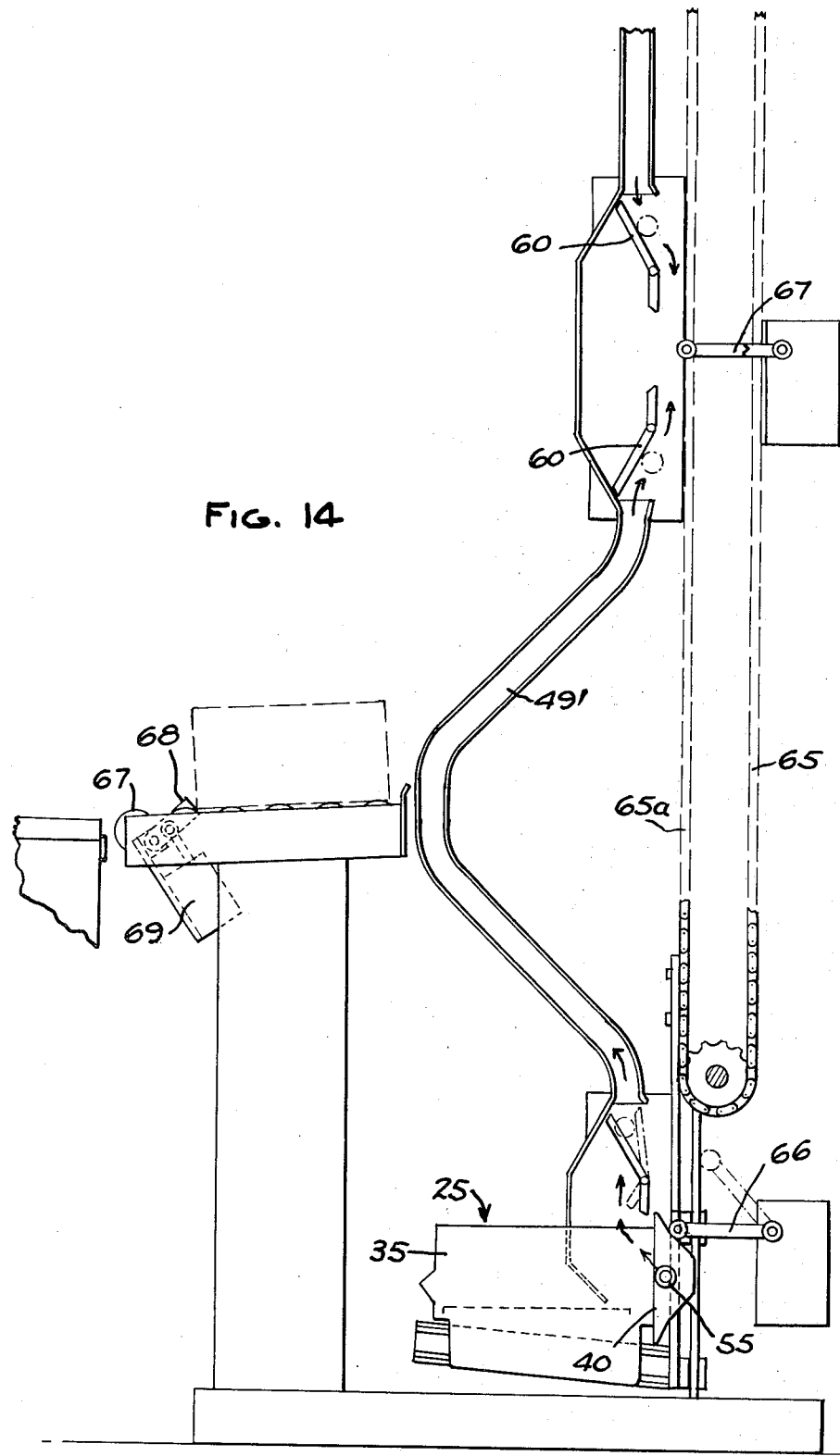
FIG. 14 is a fragmentary vertical elevational view of a portion of a modified conveyor.

In the form of the invention shown in FIG. 14 and diagrammatically in FIG. 6, the endless conveyor 65 is trained over sprockets such that the plane of the conveyor is parallel to the direction in which the article support is to be moved laterally for loading or unloading. In all other respects, the structure is identical. In this form, the conveyor is operated in opposite directions to move the carriers vertically and only the front reach 65a is utilized.

In operation of the conveyor shown in FIG. 14, any station may function as a loading or unloading station since the reach 65a is reciprocated vertically. Thus, in the position shown in FIG. 14 wherein the carrier 25 is at the lower end of the conveyor, if there is no load, then the actuator lever 66 is locked in position causing the cam 40 to engage the lever 66 and be moved transversely and, in turn, move article support 35 to a position wherein the roller 55 thereon engages the guide track 49'. Further movement of the conveyor will bring the article support 35 into position past the loading station to pick up a load thereon. After picking up the load, further continuous movement of the conveyor will bring the article support 35 to its original position with respect to the base of the conveyor. Spring-loaded levers function at each end of the guide track 49' to insure passage of the roller 55 to its original position.

If the carrier 25 is at the upper end of its travel and it is desired to unload any article therefrom, lever 67 is locked and thereby engages the cam to move the article support transversely to be guided by the guide track 49' to the station for unloading.

As shown in FIG. 14, the loading and unloading station comprises two rows of rollers 67 that are inclined outwardly with respect to the horizontal. Thus, any load thereon tends to move away from the conveyor. A stop 68 controlled by a piston 69 will hold any load in position for loading onto the conveyor but may be actuated to release any load delivered thereto so that the load will pass on to another conveyor or horizontally to a table.

I claim:

1. The combination comprising
a conveyor having a vertical reach,
at least one station along the length of said vertical reach,
a carrier comprising a base fixed to said conveyor and an article support on said base,
means for mounting said article support on said base for movement in a direction transversely to the direction of movement of said conveyor to move the article support adjacent said station, said means being such that said article support is urged toward said conveyor,
a cam on said article support,
selectively actuatable actuator means adjacent said station for engaging said cam to project said article support transversely of said base,
guide follower means on said article support,
and fixed guide means for engaging said follower means when said article support is projected for guiding said support to move said article support transversely relative to the base as the conveyor moves in a vertical direction such that the article support is adjacent the station when the conveyor moves the base adjacent said station and to move the article support to its retracted position after passing said station, said cam and guide follower being unrestrained during the normal movement of said article support by said conveyor in advance of and beyond said station.

2. The combination set forth in claim 1 wherein said actuator means comprises a member normally yieldingly urged into the path of said cam, and means for locking said member against said yielding movement to thereby forcibly be engaged by said cam and move said article support transversely.

3. The combination set forth in claim 2 wherein said cam has vertically spaced actuator engaging surfaces adapted to be engaged by said member.

4. The combination set forth in claim 2 wherein said guide follower comprises a roller on each said cam, said guide means comprising a fixed track which is engaged by said rollers to move the article support transversely to a position adjacent said station and thereafter return said article support to its retracted position relative to said base.

5. The combination set forth in claim 1 wherein said conveyor comprises an endless chain, at least one sprocket over which said chain is trained, the plane of said chain being at a right angle to the transverse movement of said article support with respect to said base.

6. The combination set forth in claim 1 including an additional station adjacent another vertical reach of said conveyor and substantially identical actuator means and guide means at said station.

7. The combination set forth in claim 1 wherein said conveyor comprises an endless chain trained over sprockets, the plane of said chain being parallel to the direction of transverse movement of said article support relative to said base.

8. The combination set forth in claim 1 wherein said actuator means comprises a lever in the normal path of said cam, said lever being normally moved out of its normal position by movement of said cam vertically as the conveyor carries the base and article support vertically.

9. The combination set forth in claim 1 wherein said actuator means comprises a lever pivoted for movement and normally being in the path of said cam such that it is moved by said cam and is returned to the path of said cam, and means for engaging said lever to prevent rotation thereof such that the cam will be engaged by said lever and will be forced to move the article support transversely of said base.

10. The combination comprising a conveyor having two vertical reaches, at least one station along each reach of said conveyor such that as the conveyor is moved, one said station functions as a loading station and the other as an unloading station, a plurality of carriers comprising a base fixed to said conveyor and an article support on said base, means for mounting said article support on said base for movement in a direction transversely to the direction of movement of said conveyor to move the article support adjacent said station, said means being such that said article support is urged toward said conveyor, said conveyor comprising an endless chain, at least one sprocket over which said chain is trained, the plane of said chain being at a right angle to the transverse movement of said article support with respect to said base, a cam on each said support, selectively actuable actuator means adjacent each said station for engaging said cam to project said article support transversely of said base, guide follower means on said article support, and fixed guide means for engaging said follower means when said article support is projected for guiding said support to move said article support transversely relative to said base as the conveyor moves in a vertical direction such that the article support is adjacent the station when the conveyor moves the base adjacent said station and to move the article support to its retracted position after passing said station, said cam and guide follower being unrestrained during the normal movement of said article support by said conveyor in advance of and beyond said station.

11. The combination set forth in claim 10 wherein each said actuator means comprises a member yieldingly urged into the path of said cam, and means for locking said member against said yielding movement to thereby forcibly be engaged by said cam and move said article support transversely.

12. The combination set forth in claim 11 wherein said cam has vertically spaced actuator engaging surfaces adapted to be engaged by said member.

13. The combination set forth in claim 11 wherein said guide follower comprises a roller on each said cam, said guide means comprising a fixed track which is engaged by said rollers to move the article support transversely to a position adjacent said station and thereafter return said article support to its retracted position relative to said base.

14. The combination set forth in claim 11 wherein said actuator means comprises a lever in the normal path of said cam, said lever being normally moved out to its normal position by movement of said cam vertically as the conveyor carries the base and article support vertically.

15. The combination set forth in claim 10 wherein said actuator means comprises a lever pivoted for movement and normally being in the path of said cam such that it is moved by said cam and is returned to the path of said cam, and means for engaging said lever to prevent rotation thereof such that the cam will be engaged by said lever and will be forced to move the article support transversely of said base.

16. The combination comprising a conveyor having a vertical reach, at least one station along the length of said vertical reach, a carrier comprising a base fixed to said conveyor and an article support on said base, means for mounting said article support on said base for movement in a direction transversely to the direction of movement of said conveyor to move the article support adjacent said station, said means being such that said article support is urged toward said conveyor, guide follower means on said article support, fixed guide means for engaging said follower means when said article support is projected for guiding said support to move said article support transversely relative to the base as the conveyor moves in a vertical direction such that the article support is adjacent the station when the conveyor moves the base adjacent said station and to move the article support to its retracted position after passing said station, and selectively actuable actuator means adjacent said station independent of said guide means operable to engage the article support and project said article support transversely of the base into alignment with the guide means.

* * * * *